US008873120B2

(12) United States Patent
Tsang et al.

(10) Patent No.: US 8,873,120 B2
(45) Date of Patent: Oct. 28, 2014

(54) COMPUTER IMPLEMENTED METHOD FOR GENERATING BINARY HOLOGRAMS

(71) Applicant: City University of Hong Kong, Kowloon (HK)

(72) Inventors: Wai Ming Tsang, Kowloon (HK); Wai Keung Cheung, Kowloon (HK)

(73) Assignee: City University of Hong Kong, Kowloon Tong, Kowloon (HK)

( * ) Notice: Subject to any disclaimer, the term of this patent is extended or adjusted under 35 U.S.C. 154(b) by 0 days.

(21) Appl. No.: 13/965,274

(22) Filed: Aug. 13, 2013

(65) Prior Publication Data

US 2013/0329269 A1 Dec. 12, 2013

Related U.S. Application Data

(62) Division of application No. 12/728,528, filed on Mar. 22, 2010, now abandoned.

(51) Int. Cl.
G03H 1/08 (2006.01)
G03H 1/12 (2006.01)
G03H 1/22 (2006.01)
G03H 1/26 (2006.01)
G03H 1/04 (2006.01)
G03H 1/00 (2006.01)

(52) U.S. Cl.
CPC ............... G03H 1/08 (2013.01); G03H 1/0891 (2013.01); G03H 2001/0478 (2013.01); G03H 1/0011 (2013.01); G03H 2240/62 (2013.01); G03H 1/22 (2013.01); G03H 2240/41 (2013.01); G03H 2240/21 (2013.01); G03H 1/0808 (2013.01); G03H 2210/30 (2013.01); G03H 1/26 (2013.01); G03H 1/0841 (2013.01)
USPC .................................... 359/9; 359/11; 359/32

(58) Field of Classification Search
None
See application file for complete search history.

(56) References Cited

U.S. PATENT DOCUMENTS 7,999,981 B2 8/2011 Kitamura
2003/0151784 A1 8/2003 Kitamura et al.

OTHER PUBLICATIONS

Eschbach, Reiner, "Comparison of error diffusion methods for computergenerated holograms", Applied Optics, 30(26):3702-3710, Sep. 1991.
Hung, Thomas S., "Digital Holography", Proceedings of the IEEE, 59(9):1335-1351, Sep. 1971.

Primary Examiner — Jade R Chwasz
(74) Attorney, Agent, or Firm — Leydig, Voit & Mayer, Ltd.

(57) ABSTRACT

A numerical method of recording a two or three dimensional object scene in a binary hologram. When the binary hologram is illuminated with a reference beam, the original object scene can be reconstructed and observed by a viewer. As the hologram is binary, i.e. composed of black or white pixels, it can be printed with commodity printers. The process is simple, fast, and economical, hence decreasing the cost and time for hologram design and production. In addition, with binary holograms, the ability to store the holograms is enhanced and binary holograms facilitate efficient transmission of the holograms.

18 Claims, 8 Drawing Sheets

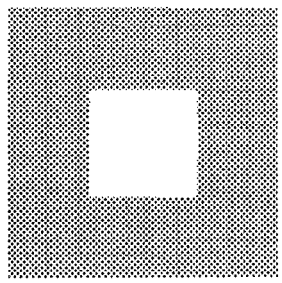
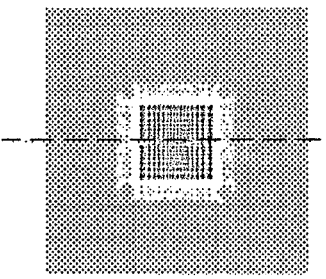
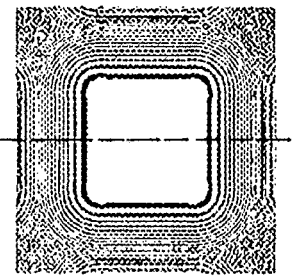
FIG.3a     FIG.3b     FIG.3c
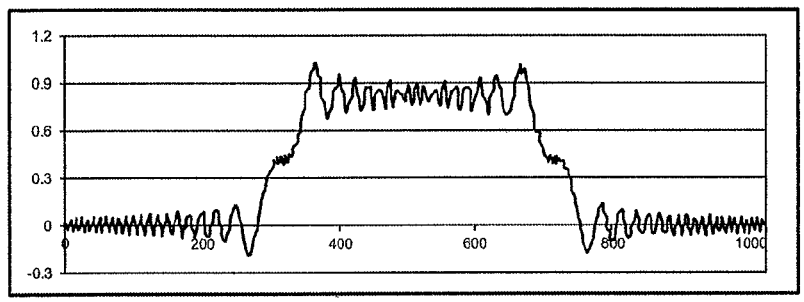
FIG.3d
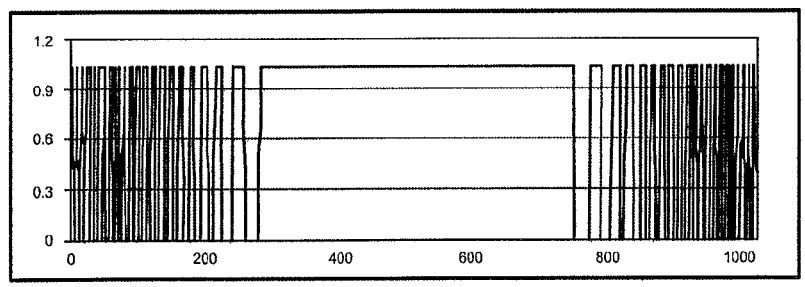
FIG.3e

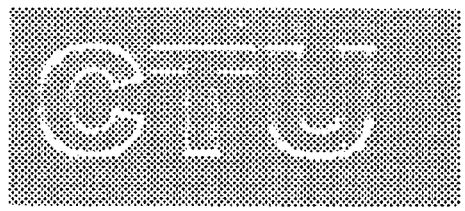
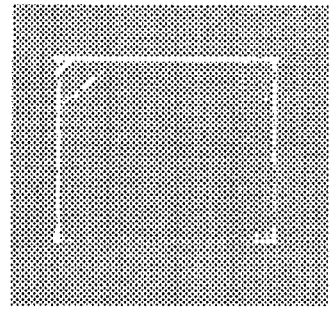
FIG.4c　　　　　　　　FIG.4d
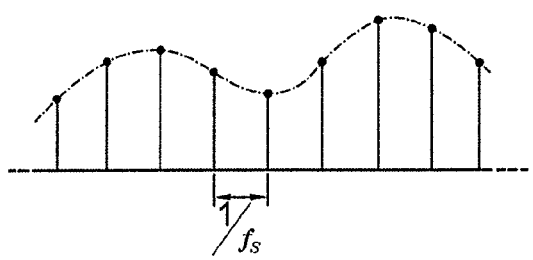
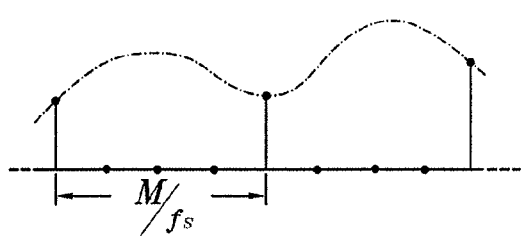
FIG.6a　　　　　　　　FIG.6c
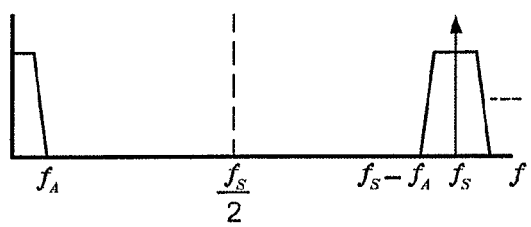
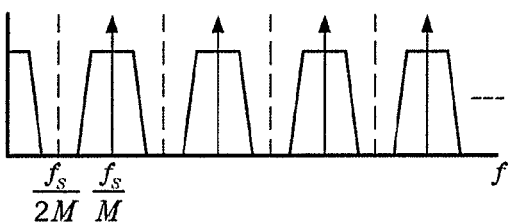
FIG.6b　　　　　　　　FIG.6d

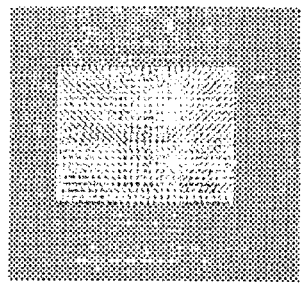
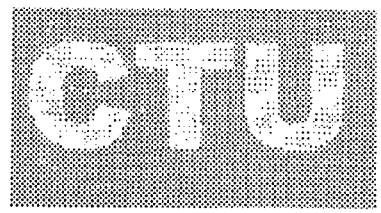
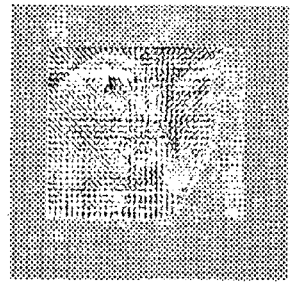
FIG.8a  FIG.8b  FIG.8c
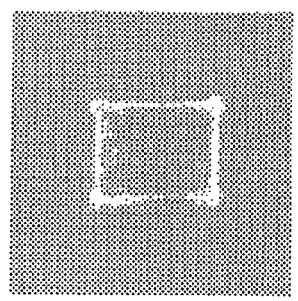
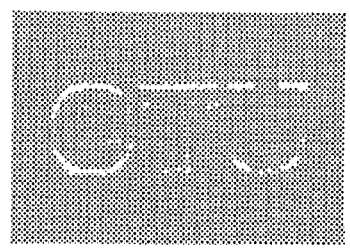
FIG.9a  FIG.9b
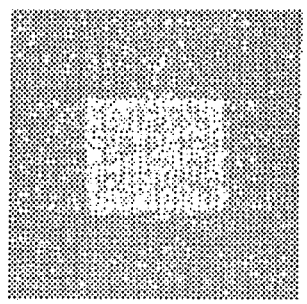
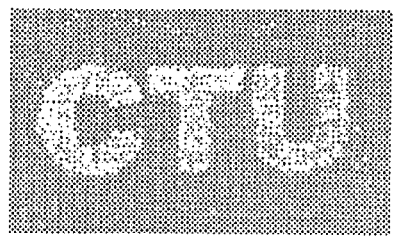
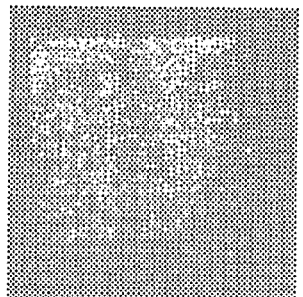
FIG.9c  FIG.9d  FIG.9e

COMPUTER IMPLEMENTED METHOD FOR GENERATING BINARY HOLOGRAMS

FIELD OF THE INVENTION

The invention relates to a computer implemented method for generating binary holograms and, in particular, to a method of generating binary holograms that does not make use of thresholding or injecting noise signals into the holograms in order to binarize them.

BACKGROUND OF THE INVENTION

In holography, some of the light scattered from an object or a set of objects falls on a recording medium. A second light beam, known as the reference beam, also illuminates the recording medium, so that interference occurs between the two beams. The resulting light field is an apparent fringe pattern of varying intensity which is the hologram. It can be shown that if the hologram is illuminated by the original reference beam, a light field is diffracted by the reference beam which is identical to the light field which was scattered by the object or objects. Thus, someone looking into the hologram "sees" the objects even though they are no longer present. There are a variety of recording materials which can be used, including photographic film. Holograms can also be computer generated.

In the past holograms have usually been binarized by thresholding, or injecting noise signals into the holograms using methods such as the random phase or the error diffusion (or similar) methods. These approaches either result in poor and/or noisy reconstructed images, or the structural content is degraded, sometimes to the degree that no discernable image can be reproduced.

It has previously been shown through computer generated holography (CGH) that a three-dimensional object scene can be recorded as, or represented by, a binary hologram instead of a gray-scale hologram, i.e. the pixels forming the hologram comprise binary values rather than eight or sixteen bit grey scale values, for example. Binary encapsulation of holograms therefore allows the holograms to be recorded with much smaller data sizes, and enables the swift production of printed holographic images on suitable mediums using commodity printers which are only capable of outputting black and white dots. For static object scenes, this means of production is substantially lower in cost than the conventional use of a spatial light modulator, and also enables printing or display of very large holograms on suitable media. When a binary hologram is displayed on an electronically accessed display device, such as a spatial light modulator, the reconstructed image of the object scene recorded by the hologram is not affected by the non-linear characteristics of the display device. In addition, with binary holograms, the storage capacity of the binary holograms is enhanced and this facilitates much more efficient transmission of holograms over transmission media.

Investigations have been conducted to understand the causes of and address the distortions caused by quantization or digitizing of grey-scale holograms, but little, if anything, appears to have been done to address problems encountered with binary computer generated holograms which have been found to produce severe distortion upon reconstruction. In particular, if the original object is complicated, there may be no discernable reconstruction of the recorded image possible or the hologram will not allow the original object scene to be reproduced for viewing.

OBJECTS OF THE INVENTION

An object of the invention is to mitigate or obviate to some degree one or more problems associated with known methods of computer generated binary holograms.

The above object is met by the combination of features of the main claim; the sub-claims disclose further advantageous embodiments of the invention.

One skilled in the art will derive from the following description other objects of the invention. Therefore, the foregoing statement of object is not exhaustive and serves merely to illustrate some of the many objects of the present invention.

SUMMARY OF THE INVENTION

In a first main aspect of the invention, there is provided a method for creating a computer generated binary hologram of an object scene, said method comprising the steps of: downsampling an object scene by sampling said object scene along two or more lines defined in each of a plurality of image planes of said object scene to provide a plurality of downsampled images, generating a hologram comprising a computed two-dimensional interference fringe pattern of said downsampled images with a reference light; and binarizing said hologram to provide a binary hologram from which the object scene can be reproduced when irradiated with a reference light.

The step of binarizing comprises assigning binary values according to the phases of the hologram pixels. This may involve assigning white and black levels respectively to positive and negative polarized hologram pixels.

The method may comprise the step of printing the binary hologram on a surface of a light transmissive and/or a light reflective medium, preferably using a conventional black/white printer. The method may also comprise the step of projecting a reference light beam onto a surface of the medium on which the binary hologram is printed, or projecting a reference light beam from behind and through the medium on which the binary hologram is printed, thus enabling the original object scene to be reproduced for viewing by a viewer.

Additionally or alternatively, the method of may comprise the step of projecting the binary hologram onto a surface of a light transmissive and/or a light reflective medium. This may also include the step of projecting a reference light beam onto a surface of the medium on which the binary hologram is being projected, or projecting a reference light beam from behind and through the medium on which the binary hologram is being projected. It may also include step of projecting a series of times-sequenced binary holograms onto said surface of a light transmissive and/or a light reflective medium in order to generate a three-dimensional moving image.

The method may involve using two or more lines which intersect each other. The two or more lines may comprise two or more sets of spaced apart lines where the lines of one set may intersect the lines of at least one other set. The two or more set of lines may comprise sets of non-uniformly spaced lines or uniformly spaced lines. The two or more set of lines may comprise four sets of intersecting lines which may include a first set of lines passing horizontally through the respective image plane, a second set of lines passing vertically through said image plane, a third set of lines passing diagonally downwards from left to right through the image plane, and a fourth set of lines passing diagonally upwards from left to right through the image plane.

In a second main aspect of the invention, there is provided a system for creating a computer generated binary hologram of an object scene, said system comprising: means for downsampling an object scene by sampling said object scene along two or more lines defined in a plurality of image planes of said object scene to provide a corresponding plurality of downsampled images, means for generating a hologram comprising a computed two-dimensional interference fringe pattern of said plurality of downsampled images with a reference light; and means for binarizing said hologram to provide a binary hologram from which the object scene can be reproduced when irradiated with a reference light.

In a third main aspect of the invention, there is provided a method for reproducing an object scene recorded in a computer generated binary hologram, where said computer generated binary hologram has been created using the method of the first main aspect, said method comprising the steps of: printing or projecting the binary hologram on a surface of a light transmissive and/or a light reflective medium; and projecting a reference light beam onto a surface of the medium on which the binary hologram is printed or projected, or projecting a reference light beam from behind and through the medium on which the binary hologram is printed or projected.

The method may comprise the step of projecting a series of time-sequenced binary holograms onto said surface of a light transmissive and/or a light reflective medium in order to generate a three-dimensional moving image.

In a fourth main aspect of the invention, there is provided a system for reproducing an object scene recorded in a computer generated binary hologram, where said computer generated binary hologram has been created using the method of the first main aspect, said system comprising: means for printing or projecting the binary hologram on a surface of a light transmissive and/or a light reflective medium; and means for projecting a reference light beam onto a surface of the medium on which the binary hologram is printed or projected, or projecting a reference light beam from behind and through the medium on which the binary hologram is printed or projected.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIGS. 3a to c illustrate a solid square, its on-axis hologram before binarization, and its on-axis hologram after binarization, respectively;

FIG. 3d is an intensity profile along the horizontal dotted line of the hologram in FIG. 3b;

FIG. 3e is an intensity profile along the horizontal dotted line of the hologram in FIG. 3c;

FIG. 4c is a reconstruction of a binary hologram formed by a known technique of the image "CTU" in FIG. 4a;

FIG. 4d is a reconstruction of a binary hologram formed by a known technique of the image "Lenna" in FIG. 4b;

FIG. 6a shows the original oversampled signal I;

FIG. 6b shows the original oversampled signal of FIG. 6a's spectrum with $f_S$ as a sampling frequency;

FIG. 6c shows the downsampled signal I;

FIG. 6d shows the downsampled signal of FIG. 6c's spectrum with $f_S$ as a sampling frequency;

FIG. 8a is a reconstruction of hologram of a white square after down-sampling by 16 times in accordance with the method of the invention;

FIG. 8b is a reconstruction of hologram of the image "CTU" after down-sampling by 16 times in accordance with the method of the invention;

FIG. 8c is a reconstruction of hologram of the image "Lenna" after down-sampling by 16 times in accordance with the method of the invention;

FIG. 9a is an optical reconstruction of the hologram of a white square using conventional techniques;

FIG. 9b is an optical reconstruction of the hologram of the image "CTU" using conventional techniques;

FIG. 9c is an optical reconstruction of the hologram of a white square after down-sampling by 16 times in accordance with the method of the invention;

FIG. 9d is an optical reconstruction of the hologram of the image "CTU" after down-sampling by 16 times in accordance with the method of the invention;

FIG. 9e is an optical reconstruction of the hologram of the image "Lenna" after down-sampling by 16 times in accordance with the method of the invention.

DESCRIPTION OF PREFERRED EMBODIMENTS

The following description is of a preferred embodiment by way of example only and without limitation to the combination of features necessary for carrying the invention into effect.

In order to understand the novel method disclosed herein, it is firstly useful to understand some general techniques relating to the generation of holograms and to understand how distortion occurs in binary holograms generated using conventional techniques.

Figure 1:
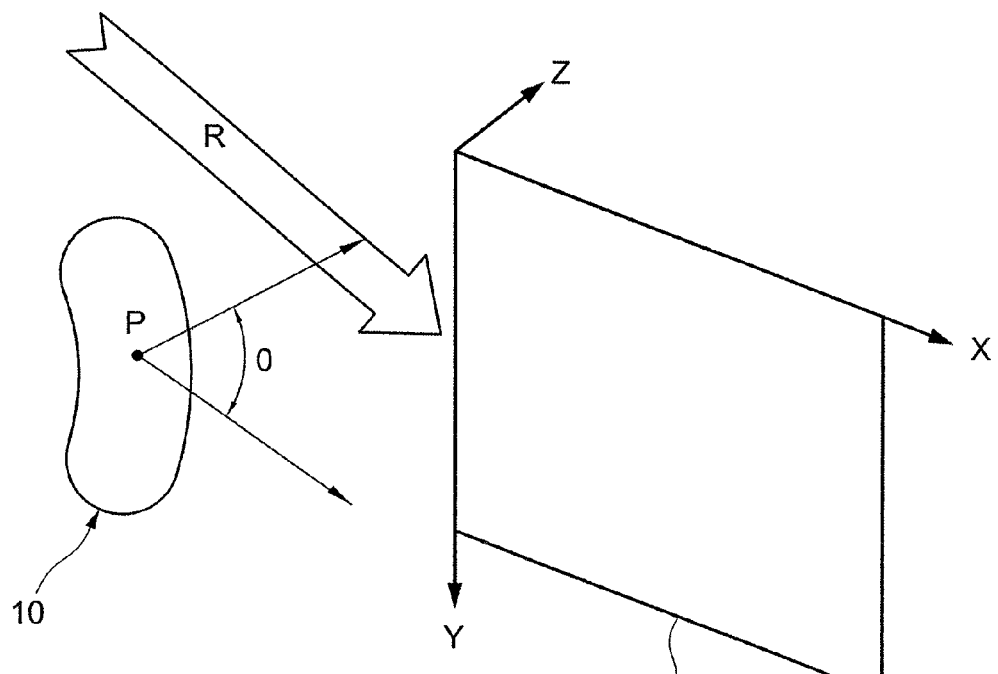
FIG. 1 is a diagram showing a general hologram creation method using an optical technique.

FIG. 1 is a diagram showing a general hologram creation method using an optical method, in which a method for recording an object scene 10, i.e. an original image, on a recording surface 20 as interference fringes is shown. An XYZ three-dimensional coordinate system is defined as illustrated, and the recording surface 20 is placed on an XY plane. An object scene to be a recording target is prepared as the original image 10. An object light O emitted from an arbitrary point P on the original image 10 proceeds toward the entire surface of the recording surface 20. A reference light R is irradiated onto the recording surface 20. Consequently, interference fringes of the object light O and reference light R are recorded on the recording surface 20. From the hologram recorded on the recording surface 20, it is possible by use of the reference signal to reproduce the original image for viewing by a user, although a spatial light modulator as known in the art may be required for image viewing.

Figure 2:
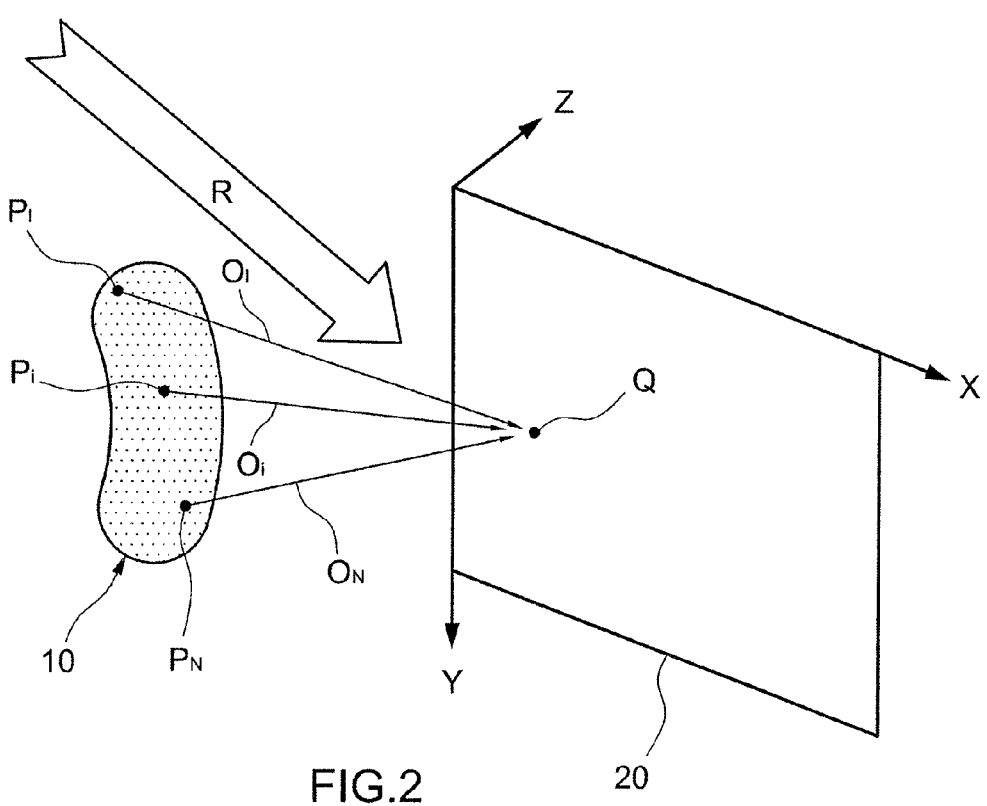
FIG. 2 is a diagram showing a general hologram creation method using a computer implemented method.

Referring to FIG. 2, in order to create a computer generated hologram at the position of the recording surface 20, the object scene (original image) 10, recording surface 20, and reference light R are respectively defined as data on a computer, and interference wave intensities at respective positions on the recording surface 20 are calculated using processor means of the computer and suitably encoded processor executable instructions stored in a memory of the computer. As shown in FIG. 2, the original image 10 may be considered as comprising a matrix of N point light sources P1, P2, P3, ..., Pi, ..., $P_N$. In theory, there would be an infinite number of such point light sources, but, in practice, the number is determined according to factors such as the capabilities of the computer processor and the desired resolution of reproduced images. From the multiple point light sources, it can be considered that these provide respective object lights O1, O2, O3, ..., Oi, ..., $O_N$ proceeding to a calculation point Q(x, y). The reference light R is irradiated toward the calculation point Q(x, y), and a calculation is carried out to determine amplitude intensity of an interference wave caused by an interference between these N object lights O1 to $O_N$ and reference light R at the point of the calculation point Q(x, y). The object lights and reference light are considered as monochromatic lights to carry out the calculation. On the recording surface 20, a large number of calculation points are defined at a predetermined pitch, and for each of the calculation points, amplitude intensity is calculated, whereby an intensity distribution of interference waves can be obtained on the recording surface 20. From the computer generated hologram calculated for the recording surface 20, it is possible to reproduce the original image for viewing by a user. Reference is made herein to U.S.2008/0225359. It will be appreciated that this comprises one computer implemented mathematical method for generating a hologram using a computer, but that other computer implemented method are known.

In either case, the recorded holograms can be binarized using known techniques.

One way to produce a physical binary hologram from a computer generated hologram is to create a binary pattern on an actual medium based on image data comprising the intensity distribution of the recorded hologram. By this means a binary hologram for which the original image 10 has been computed by processing means as interference fringes can be created. With existing techniques, however, the use of a spatial light modulator may be necessary for reproducing the original image from the hologram.

As already indicated, known binary holograms have been found to produce severe distortion upon image reproduction such that the hologram will not reproduce the original object scene to any discernible degree. The reasons for this may be understood from the following.

Figure 3F:
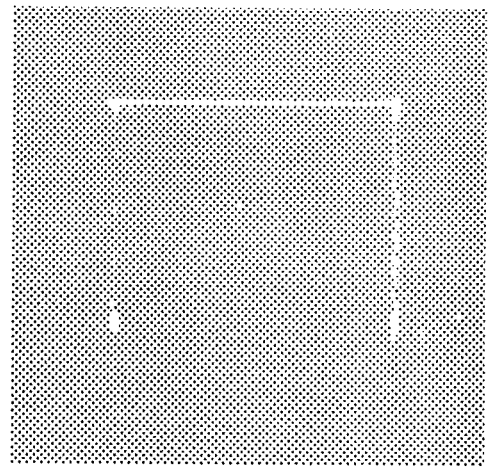
FIG. 3f is a reconstruction of the binarized hologram in FIG. 3c.

A generic way of binarization is to assign white and black levels to positive and negative hologram pixels, respectively. The process also reduces the data size of the hologram as each pixel is only represented with 1 bit. To illustrate the binarization effect, a solid square, and its on-axis hologram before and after binarization are shown in FIGS. 3a) to 3c), respectively. The intensity profile along the horizontal dotted line of the hologram is shown in FIG. 3d) while in FIG. 3e) is shown a line trace across the center of the binarized hologram. Finally, in FIG. 3f), there is shown the reconstruction of the binarized hologram in which it can be seen that severe distortion occurs which renders the reproduced binary image almost indiscernible. The reconstruction does show, however, an interesting edge extraction of the original object. This may be explained by noticing that the small high frequency fringes (away from the center of the hologram) in the intensity profile of FIG. 3d) have been emphasized, thereby creating highpass-type filtering on the original un-binarized hologram.

Figure 4A:
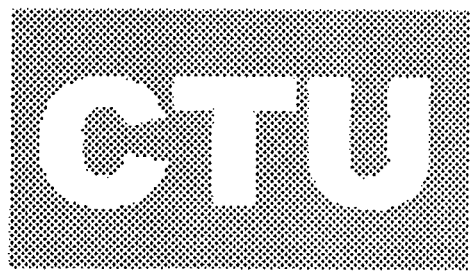
FIG. 4a is an image "CTU"
Figure 4B:
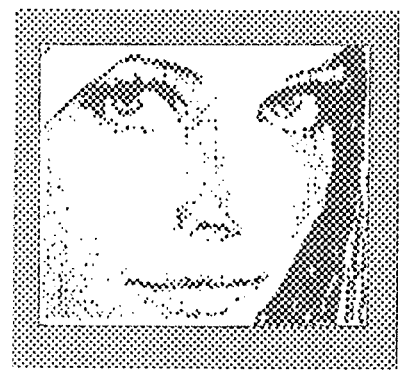
FIG. 4b is an image referred to as "Lenna"

In FIGS. 4a) and b), shown is a binary image "CTU" and a picture of "Lenna," respectively. Their respective reconstructions after binarization of their holograms are shown in FIGS. 4c and 4d). Again, note that for the binary object as in "CTU", the binarized hologram shows an effective edge extracted reconstruction, although the reproduced image is of poor quality. However, for the more complicated grey-scale image such as that of Lenna, there is much more severe distortion, namely of the interior content, which is due to the nonlinearity created by binarization. In fact, no discernable reconstructed image can be observed.

In accordance with the novel method of the invention, the object scene shown in FIG. 2, which may be considered as comprising a matrix of N point light sources P1, P2, P3, ..., Pi, ..., $P_N$, can be represented as a sequence of discrete image planes which are parallel to the hologram plane. Each image plane $I(u,v;z_j)$ contains the point light sources that are at a depth of $z_j$ from a holographic recording plate. On the image plane $I(u,v;z_j)$, if a location contains a point light source, the corresponding pixel intensity is set to the intensity of the said point light source. Otherwise, the intensity of the pixel is set to zero. Given a discrete object scene which can be represented by a sequence of planar images $I(u,v;z_j)$ each located at a depth $z_j$ from a holographic recording plane, a Fresnel hologram H(m,n) can be generated numerically as the real part of the product of the object O(m,n) and a planar reference R(m,n) waves.

$$H(m,n)=Re\{O(m,n)R^*(m,n)\}, \quad (1)$$

where Re {.} represents the real part of a complex number. The object wave is given by $$O(m, n) = \sum_{j=0}^{J-1} O(m, n; z_j) \quad (2a)$$

where J is the total number of image planes, and $$O(m, n; z_j) = \sum_{u=0}^{X-1} \sum_{v=0}^{Y-1} I(u, v; z_j) \frac{\exp(ikr(m-u, n-v; z_j))}{r(m-u, n-v; z_j)}, \quad (2b)$$

where m,u and n,v are the discrete coordinate points along the vertical and horizontal directions, respectively. The term $r(m-u,n-v;z_j)=\sqrt{(m-u)^2+(n-v)+z_j^2}$ represents the Euclidean distance between an object point at (u,v) on the image plane $I(u,v;z_j)$ and the location (m,n) on the plane of the hologram. X and Y are the vertical and horizontal extents of the image, $k=2\pi/\lambda$ is the wave-number and $\lambda$ is the wavelength of the optical beam. All pixels in the image are assumed to be self illuminating with intensity $I(u,v;z_j)$. The reference wave R(m, n) is assumed to be a plane wave or a spherical wave incident at an angle $\theta$ with respect to the normal of the hologram. If the reference wave is a plane wave, it can be represented by R(m) for simpler optical geometry.

Eq. (2b) can be encapsulated as the two dimensional convolution of the source image with the Fresnel Zone Plate $F(m,n;z_j)$.

$$O(m,n;z_j)=I(m,n;z_j)*F(m,n;z_j) \quad (3)$$

where $F(m,n;z_j)=\exp(ikr(m,n;z_j))/r(m,n;z_j)$.

Adopting the convolution operation in Eq. (3) in place of Eq. (2b), the source image is expressed as a function of m and n (i.e. $I(m,n;z_j)$).

In the foregoing, it is assumed that the parallel images planes are informly spaced from each other. However, it will be understood that the parallel image planes may be non-uniformly spaced. In general, an image plane is included for downsampling whenever it contains one or more point light source(s) in the object scene. There is no limit on the number of image planes that may be downsampled. However, in practical implementations of the method, it is simpler to assume a sequence of regularly spaced parallel image planes. For any such image planes that do not contain any point light sources, all the pixels are set to zero intensity and will not therefore contribute to the computer generation of the hologram.

It is envisaged that the object scene will, in most implementations of the method, comprise a virtual object scene, i.e. a computer generated object scene. However, if it comprises a real scene, it will firstly be converted into a digital representation OBJ(x,y,z) by an imaging means such as a digital camera or a camera with associated digital processing means, where x, y, z are the discrete rectangular coordinates of the three dimensional object scene space. OBJ(x,y,z) denotes the amplitude of an object point (if any) at position (x,y,z). If OBJ(x,y,z)=0, it means that there is no object point at (x,y,z). Each point OBJ(x,y,z) will be taken as a point light source in the calculation of the hologram.

Figure 5:
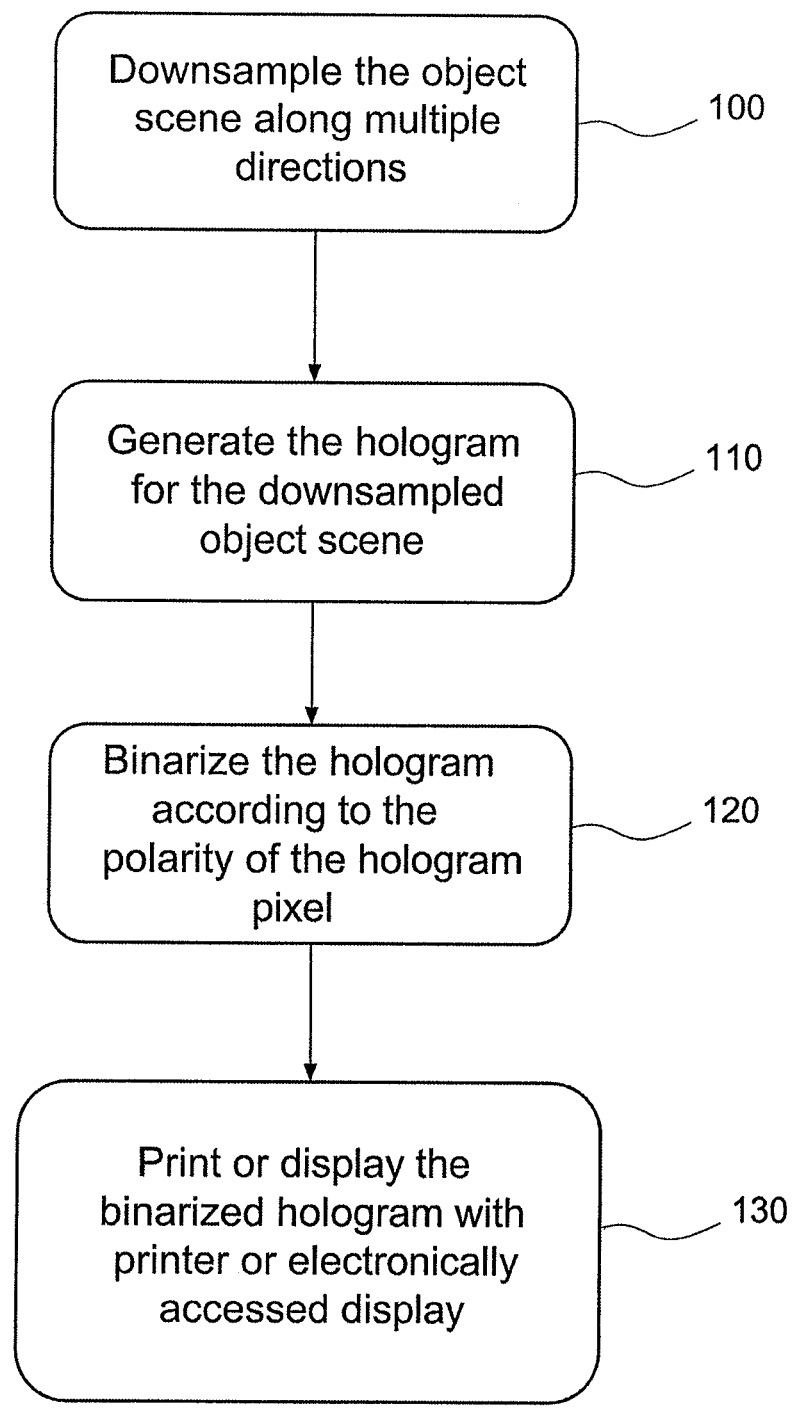
FIG. 5 is a flowchart of the method of generating a binarized hologram in accordance with the method of the invention.

The novel method for generating binary holograms according to the invention is illustrated by FIG. 5. The method comprises the steps of downsampling 100 each of a plurality of images planes of the object scene along multiple directions, generating 110 a hologram from the plurality of down-sampled object scene image planes, binarizing 120 the hologram according to the polarities of the hologram pixels, and printing or displaying 130 the binary hologram using a printer or an electronically accessed display. The method involves down-sampling the object scene by sampling each image plane $I(m,n;z_j)$ of the said object scene along two or more lines defined in each image plane of said object scene to provide a sequence of downsampled images. Preferably, downsampling involves using a matrix of spaced part horizontal, vertical, and diagonal grid lines before binarization, where the grid lines may be uniformly spaced. However, the down-sampling may use non-uniform spaced grid lines. As such, the novel method of the invention does not make use of thresholding or injecting noise signals into the holograms in order to binarize them.

The following description of the novel method is based on using uniformly spaced grid lines by way of example only, but it will be understood that the method can use non-uniformly spaced lines or even just a plurality of single lines in various orientations with respect to the image plane.

For uniform spaced grid lines, each down-sampled image plane $I_D(m,n;z_j)$ is represented as follows:

$$I_D(m,n;z_j) = I_1(m,n;z_j) \cup I_2(m,n;z_j) \cup I_3(m,n;z_j) \cup I_4(m,n;z_j) \quad (4)$$

$$\text{where } I_1(m,n;z_j) = \begin{cases} I(m,n;z_j) & m = \tau M \\ 0 & \text{otherwise} \end{cases},$$

$$I_2(m,n;z_j) = \begin{cases} I(m,n;z_j) & n = \tau M \\ 0 & \text{otherwise} \end{cases},$$

$$I_3(m,n;z_j) = \begin{cases} I(m,n;z_j) & m = n = \tau M \\ 0 & \text{otherwise} \end{cases}$$

$$I_4(m,n;z_j) = \begin{cases} I(m,n;z_j) & m = \tau M, n = -\tau M \\ 0 & \text{otherwise} \end{cases}$$

$\tau$ is an integer running from $0, \pm 1, \pm 2, \ldots$

M is an integer denoting the spacing between adjacent grid lines. The operator $\cup$ denotes the union of the multiple sets of data $I_1(m,n;z_j)$ to $I_4(m,n;z_j)$, representing sub-sampling of the image $I(m,n;z_j)$ along the vertical, horizontal, and diagonal directions. Sub-sampling tends to fill in or strengthen some frequency contents of the hologram before binarization.

For non-uniformly spaced lines, the foregoing relationships may be adapted to include a random number factor operating on the line spacing M. For example, for $I_1(m,n;z_j)$ the relationship $m=\tau M$ may be amended to $m=\alpha\tau M$, where $\alpha$, is a random number which may have a value>zero and which is preferably in the range from 0.5 to 1.5, although other ranges may be preferred based on empirical measurements.

In respect of uniformly spaced lines, to clarify further, $I_1$ is formulated mathematically in one dimension in terms of I. Thus, the sub-sampled signal can be written along the m-direction as $$I_1(m) = I(m) \sum_{r=-\infty}^{\infty} \delta(m - rM) \quad (5)$$

For illustration, m is treated as a time variable t and the spectrums of I with f as a frequency variable. FIG. 6a) shows the original oversampled signal I and its spectrum with $f_S$ as a sampling frequency, which is shown in FIG. 6b). $F_A$ denotes the bandwidth of I. Assuming that the original signal is band-limited to avoid aliasing error, the sub-sampling of the original signal $I_1$ and its spectrum are shown in FIGS. 6c) and 6d), respectively for M=4. Note that for M=4, the sub-sampled signal has four repeated spectra within the range from 0 to $f_S$.

Returning to the equation of the hologram in Eq. (3), if the Fresnel zone plate $F(m,n;z_j)$ is regarded as an input with $I(m,n;z_j)$ being an impulse response then, since $I(m,n;z_j)$ is a non-negative function, it can be considered that it performs lowpass filtering (see the spectrum of the original signal on FIG. 6b) on the fringes (Fresnel zone plates) presented on the hologram. After sub-sampling, since the lowpass filter now has been repeated along f as shown in FIG. 6d), this has the effect of filling in some of the missing frequencies, namely those frequencies around $f_S/M$, 2 $f_S/M$, etc. as shown in FIG. 6d).

Figure 7A:
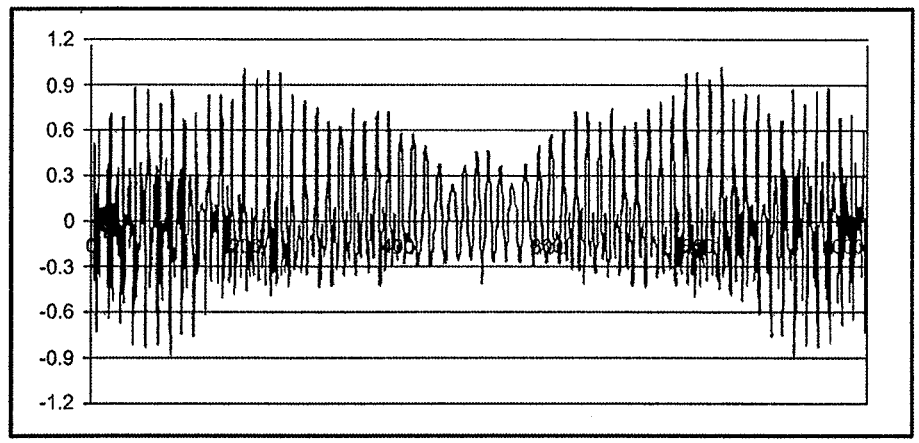
FIG. 7a is a line trace across the center of the hologram of the solid square in FIG. 3a after down-sampling by 16 times in accordance with the method of the invention.
Figure 7B:
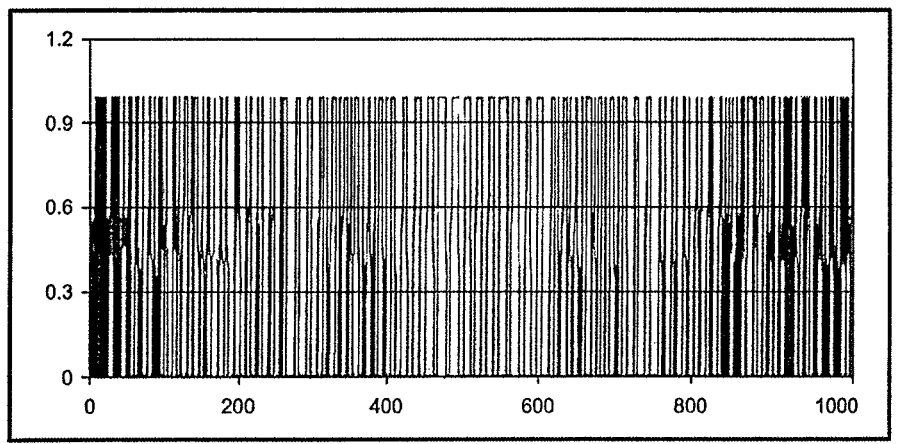
FIG. 7b is a line trace across the center of the binarized hologram of the solid square in FIG. 3a after down-sampling by 16 times in accordance with the method of the invention.

To illustrate the effect of sub-sampling, the square in FIG. 3a) is down-sampled by 16 times according to Eq. (5). Line traces across the center of the holograms before and after binarization are shown in FIGS. 7a) and 7b). These line traces can be compared with FIGS. 3d) and 3e), respectively. It is observed that in FIG. 7b), there are now some fringes, albeit binarized, in the center portion of the figure, which are responsible for bringing some of the contents or details back into the original image.

FIGS. 8a), b) and c) show the reconstructions of the proposed method. The source images are down-sampled based on Eq. (4) or (5) with a factor M=16 before binarization. The factor is selected as it results in good visual quality for all the reconstructed images. In comparison with the results in FIGS.

3f), 4c) and 4d), respectively, it can be seen that the interior regions of the images are preserved with better quality.

To further substantiate the novel method according to the invention, computer generated holograms (CGHs) were prepared for optical reconstruction. Each such hologram size was about 25 mm by 25 mm with 1024 by 1024 points/pixels. The holograms were computer-generated with the following parameters:

$\lambda$=0.65 µm, $z_0$=0.4 m with off-axis incident angle of $\theta$=1.2°. All holograms were printed with a printer with 2400 dpi on Agfa Red Sensitive films, and illuminated by a laser beam (reference light) for optical reconstruction. FIGS. 9a) and b) show the optical reconstructions for the "square" and "CTU" using conventional techniques which can be compared directly with computer simulation results of FIGS. 3f) and 4c), respectively, showing extensive distortion. Optical reconstructions using the method of the invention based on the proposed downsampled images are shown in FIGS. 9c) to 9e), which show basically the same observations as obtained in FIGS. 8a) to 8c), respectively, namely that the reproduced 3D image is less distorted and more complete, i.e. fuller, than the images (FIGS. 9a and 9b) optically reproduced from computer generated holograms formed using known methods.

It can be inferred from Eq. (5) that the higher the down-sampling factor M, the larger will be the proportion of the pass-band in the transfer function between the frequency range from 0 to $f_S$ as seen from FIG. 6d). As a result, this will decrease the resolution of the source image $I(m,n;z_j)$, constituting to certain degree of distortion. However, the increase of M will lead to high diffraction efficiency for optical reconstruction. The optimal choice of M varies between different object scenes and is determined empirically (e.g., via simulation) prior to printing. However a down-sampling factor between 8 to 20 generally results in acceptable visual quality. Finally, as sub-sampling is merely a pixel selection process, the additional amount of arithmetic operations involved in the computation of the hologram is negligible, which is desirable in the generation of CGHs.

Form the foregoing it can be seen that the invention provides a method for creating a computer generated binary hologram of an object scene. The method comprises the steps of: downsampling the object scene by sampling said object scene along two or more lines defined in each of a plurality of image planes of said object scene to provide a plurality of corresponding downsampled images and generating a hologram comprising a computed two-dimensional interference fringe pattern of said plurality of downsampled images with a reference light. The hologram is then binarized to provide a binary hologram from which the object scene can be reproduced when irradiated with a reference light.

The step of binarizing comprises assigning binary values according to the phases of the hologram pixels. This may involve assigning white and black levels respectively to positive and negative polarized hologram pixels.

The method may comprise the step of printing the binary hologram on a surface of a light transmissive and/or a light reflective medium, preferably using a conventional black/white printer. The method may also comprise the step of projecting a reference light beam onto a surface of the medium on which the binary hologram is printed, or projecting a reference light beam from behind and through the medium on which the binary hologram is printed, thus enabling the original object scene to be reproduced for viewing by a viewer.

Additionally or alternatively, the method of may comprise the step of projecting the binary hologram onto a surface of a light transmissive and/or a light reflective medium. This may include the step of projecting a reference light beam onto a surface of the medium on which the binary hologram is being projected, or projecting a reference light beam from behind and through the medium on which the binary hologram is being projected. It may also include step of projecting a series of times-sequenced binary hologram onto said surface of a light transmissive and/or a light reflective medium in order to generate a three-dimensional moving image.

The method may involve using two or more lines which intersect each other. The two or more lines may comprise two or more sets of spaced apart lines where the lines of one set may intersect the lines of at least one other set. The two or more set of lines may comprise sets of non-uniformly spaced lines or uniformly spaced lines. The two or more set of lines may comprise four sets of intersecting lines which may include a first set of lines passing horizontally through the respective image plane, a second set of lines passing vertically through said image plane, a third set of lines passing diagonally downwards from left to right through the image plane, and a fourth set of lines passing diagonally upwards from left to right through the image plane.

Figure 10:
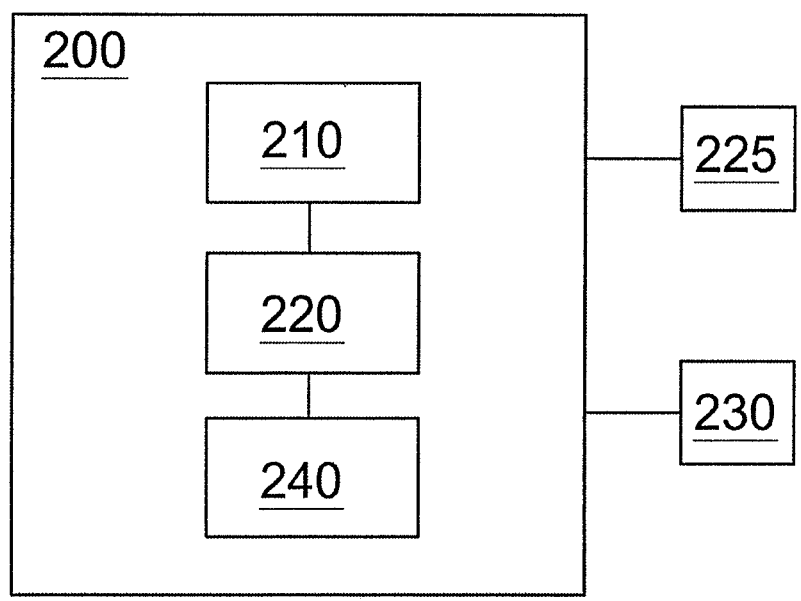
FIG. 10 is a block schematic diagram of a binary hologram generation and reproduction system according to the invention.

The invention also provides a system 200 for creating a computer generated binary hologram as illustrated in FIG. 10. The system comprises a memory 210 storing processor executable instructions and a processor 220 adapted to execute said instructions in order to implement the method of the invention. The processor is also adapted to downsample the object scene in accordance with the method as described above. The system may include an object imaging scene means 225 such as a digital camera or a camera with associated processing means for capturing a digital image of the object scene where the object scene is a real scene. In such case, the processor 220 is adapted to generate from the captured digital image the plurality of image planes for the object scene. The system 200 may also be adapted as a system for producing physical holograms by being connected to a printer 230 for printing said holograms onto a suitable light transmissive or light reflective medium as a black and white image. Additionally or alternatively, the system 200 may be adapted to display the hologram by projecting it onto a suitable screen or medium. The system includes light irradiating means 240 for directing or projecting a reference light onto a printed or displayed hologram in order to reproduce the original object scene for viewing by a viewer. The system 200 may also be adapted to project a times sequence of holograms onto said screen to enable a moving image in 3D to be reproduced for viewing by users.

It is possible with the method of the invention to store a plurality of holograms on the same recording medium by using different wavelengths for the reference light or different angles of incidence of the reference light in generation of the respective holograms. This enhances the storage efficiency of the holograms as well as providing a useful security feature on bank cards, bank notes, etc. In fact, holograms generated according to the method of the invention are particularly suited as security devices as they can be printed using conventional printers, but are such that they cannot be reproduced in a photocopy of a medium carrying one of the holograms generated according to the invention and printed using a conventional printer. This has the advantage of enabling security holograms to be easily printed on less valuable items than bank cards or bank notes or at least making available more widely the use of holograms as a security feature at low cost. For example, the hologram could be printed using conventional printers on say product labels of goods such as perfume or even less high value goods than this.

In general, the invention describes a novel numerical method of recording a two or three dimensional (2D or 3D) object scene in a binary hologram. When the latter is illuminated with a reference beam the original object scene can be reconstructed and observed by a viewer. As the hologram is binary, i.e. composed of black or white pixels, it can be printed with commodity printers. The process is simple, fast, and economical, hence decreasing the cost and time in hologram design and production. In addition, with binarized holograms, the storage capacity of digital holograms is enhanced and it facilitates more efficient transmission of the holograms.

With the method discussed herein, the reconstructed image is less noisy in shaded areas. Moreover sharp edges and structural content are preserved. It can be viewed easily with different kinds of visible light sources (such as LEDs, spot light, and tungsten lamp) as the reference light. The information recorded in the hologram is also more resistant to damage than existing hologram recording and display approaches.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A method for creating a computer-generated binary hologram of an object scene, the method comprising:
    downsampling an object scene by sampling the object scene along at least two lines defined in each of a plurality of image planes of the object scene to provide a plurality of downsampled images,
    generating a hologram comprising a plurality of hologram pixels forming a computed two-dimensional interference fringe pattern of the downsampled images with reference light; and
    binarizing the hologram pixels to provide a binary hologram from which the object scene can be reproduced when the binary hologram is irradiated with the reference light, wherein binarizing the hologram pixels includes assigning binary values to the hologram pixels according to phases of the respective hologram pixels of the hologram.

2. The method of claim 1, wherein binarizing the hologram pixels further comprises assigning white and black levels to positive and negative polarized hologram pixels, respectively.

3. The method of claim 1, further comprising printing the binary hologram on a surface of a light-transmissive and/or a light-reflective medium.

4. The method of claim 3, further comprising projecting a reference light beam onto a surface of the medium on which the binary hologram is printed, or projecting a reference light beam from behind and through the medium on which the binary hologram is printed.

5. The method of claim 1, further comprising projecting the binary hologram onto a surface of a light-transmissive and/or a light-reflective medium.

6. The method of claim 5, further comprising projecting a reference light beam onto a surface of the medium on which the binary hologram is being projected, or projecting the reference light beam from behind and through the medium on which the binary hologram is being projected.

7. The method of claim 6, further comprising projecting a series of time-sequenced binary holograms onto the surface of a light-transmissive and/or a light-reflective medium and generating a three-dimensional moving image.

8. The method of claim 1, wherein the at least two lines defined in each of a plurality of image planes intersect each other.

9. The method of claim 1, wherein the at least two lines defined in each of a plurality of image planes comprise at least two spaced apart sets of lines.

10. The method of claim 9, wherein the lines of one set of the at least two spaced apart sets of lines intersect the lines of at least one other set of the at least two spaced apart sets of lines.

11. The method of claim 9, wherein the at least two spaced apart sets of lines comprise sets of non-uniformly spaced lines.

12. The method of claim 9, wherein the at least two spaced apart sets of lines comprise spaced apart sets of uniformly spaced lines.

13. The method of claim 9, wherein the at least two spaced apart sets of lines comprise four spaced apart sets of intersecting lines.

14. The method of claim 13, wherein the four spaced apart sets of lines comprise a first set of lines passing horizontally through a respective image plane, a second set of lines passing vertically through the image plane, a third set of lines passing diagonally downwards from left to right through the image plane, and a fourth set of lines passing diagonally upwards from left to right through the image plane.

15. A method for reproducing an object scene recorded in a computer-generated binary hologram, wherein the computer-generated binary hologram has been created using the method of claim 1, the method comprising:
    printing or projecting the binary hologram on a surface of a light-transmissive and/or a light-reflective medium; and
    projecting a reference light beam onto a surface of the medium on which the binary hologram is printed or projected, or projecting the reference light beam from behind and through the medium on which the binary hologram is printed or projected.

16. The method of claim 15, further comprising projecting a series of times-sequenced binary holograms onto said surface of the light-transmissive and/or the light-reflective medium and generating a three-dimensional moving image.

17. A system for reproducing an object scene recorded in a computer-generated binary hologram, wherein the computergenerated binary hologram has been created using the method of claim 1, the system comprising:
- means for printing or projecting the binary hologram on a surface of a light-transmissive and/or a light-reflective medium; and
- means for projecting a reference light beam onto a surface of the medium on which the binary hologram is printed or projected, or projecting the reference light beam from behind and through the medium on which the binary hologram is printed or projected.

18. A system for creating a computer-generated binary hologram of an object scene, the system comprising:
- means for downsampling an object scene by sampling each of a plurality of image planes of the object scene along at least two lines defined in each image plane of the object scene to provide a plurality of downsampled images,
- means for generating a hologram comprising a plurality of hologram pixels forming a computed two-dimensional interference fringe pattern of the plurality of downsampled images with reference light; and
- means for binarizing the hologram pixels to provide a binary hologram from which the object scene can be reproduced when the binary hologram is irradiated with the reference light by assigning binary values to the hologram pixels according to phases of the respective hologram pixels of the hologram.

* * * * *